UNITED STATES PATENT OFFICE 2,112,986

PROCESS FOR PRODUCING RESINOUS REACTION PRODUCTS

Frederick E. Frey and Robert D. Snow, Bartlesville, Okla., assignors to Phillips Petroleum Company, Bartlesville, Okla., a corporation of Delaware No Drawing. Application July 23, 1935, Serial No. 32,821

12 Claims. (Cl. 260—2)

The present invention relates to the production of resinous bodies by reacting sulfur dioxide with mixtures of two or more olefin hydrocarbons.

An object of this invention is to make resinous bodies having improved molding characteristics and mechanical properties by reacting sulfur dioxide with a mixture of two or more olefins.

Another object of this invention is to vary the physical properties and mechanical strength of a resinous reaction product of sulfur dioxide by varying the proportion of two or more olefins entering the reaction.

Other objects and advantages of the invention will be apparent during the course of the following description.

The fact that pure individual olefins, such as ethylene, propylene and butene-2 will react with sulfur dioxide has been known for several years (Mathews and Elder, Brit. 11,635 (1914)). Representative values for the physical properties and mechanical strengths of resins made by reacting sulfur dioxide with pure single olefins are about as follows:

improved physical properties. We have found that solubility in various ordinary solvents can thus be produced in a propylene resin, ordinarily very insoluble, by causing the resin forming reaction to take place in the presence of an appropriate olefin of higher molecular weight. Mechanical strength can be markedly enhanced by forming such a complex resin under conditions to be set forth, and other improvements can be produced. Some properties, such as specific gravity, are merely intermediate between those of resins produced by separately reacting the olefins with sulfur dioxide. Isomeric olefins, such as the isomeric chain olefins butene-1 and butene-2, pentene-1 and pentene-2, and hexene-1 and hexene-2; also produce superior products when mixed before reacting.

In the following table are listed a number of resins of this hybrid type together with tests of mechanical strength:

| Sulfur dioxide resin from | | Tensile strength lb./sq. in. | Compressive strength lb./sq. in. | Transverse strength lb./sq. in. | Impact strength energy in ft./in. sq. |
|---|---|---|---|---|---|
| *92% propylene | 8% butene-1 | 3,800–4,300 | 23,400–24,250 | 6,000–7,150 | |
| 84% propylene | 16% butene-1 | 3,820–4,260 | 21,250–21,850 | 7,100–7,980 | 1.56–1.92 |
| 75% propylene | 25% butene-1 | 5,615 | 22,150–23,100 | 6,570–8,450 | 1.50–1.83 |
| 50% propylene | 50% butene-1 | 5,929 | | 7,210–8,050 | 1.68–1.79 |
| 87.5% propylene | 12.5% butene-2 | 4,230–4,415 | 22,400–22,650 | 5,910–7,000 | 1.74–1.98 |
| 75% propylene | 25% butene-2 | 3,820–4,080 | 21,850–22,400 | 4,900–5,290 | 1.77–1.82 |
| 50% propylene | 50% butene-2 | 4,070–4,200 | 19,350–19,650 | 4,800–6,900 | 1.73–1.77 |
| 75% propylene | 25% pentene-1 | 2,792–3,715 | 12,350–12,850 | 3,650–4,960 | 1.37–1.54 |
| 50% propylene | 50% pentene-1 | 2,800–3,820 | 12,350–18,350 | 4,235–5,700 | 1.78–1.88 |
| 50% butene-2 | 50% butene-1 | 3,820 | 15,600 | 4,730 | 1.85 |

*All percentages are expressed in mol. per cent.

The values given in the tables cover the entire range of values obtained in actual molding and testing of several specimens from each batch of resins. In general it may be said that the me-

| Sulf. diox. resin from | Specific gravity | Tensile strength lb./sq. in. | Compressive strength lb./sq. in. | Transverse strength lb./sq. in. | Impact strength energy in ft. lb./in. square |
|---|---|---|---|---|---|
| Propylene | 1.49–1.51 | 3,000–4,000 | 20,000–24,000 | 4,000–6,700 | 1.42–1.96 |
| Butene-1 | 1.35–1.40 | 3,100–4,100 | 12,000–16,000 | 4,000–6,000 | 1.14–1.18 |
| Butene-2 | 1.30–1.36 | 2,500–4,500 | 16,300–20,500 | 4,700–6,000 | 1.47–1.83 |
| Pentene-1 | 1.31 | 2,100–3,200 | 12,300–15,300 | 3,200–4,200 | .65–1.32 |

Note: The above tests were made by the standard A. S. T. M. method.

We have found that under appropriate conditions sulfur dioxide can be caused to react with two or more selected olefins containing different numbers of carbon atoms to produce resinous products of high molecular weight and greatly chanical strength of the resins from blends of propylene and butenes, for example, is much higher than that of resins from either pure olefin. The brittleness is decreased by blending butenes with propylene, thus giving a tougher molded product.

This shows up not only in the greater impact strength value, but also in the greatly decreased fragmentation on failure. The brittle propylene resin, on failure under compression, disintegrates to small sharp fragments with explosive violence. The resin from blends of propylene and butene, when compressed beyond the ultimate strength, yields by a gradual sidewise expansion and cracking without throwing off fragments.

The machinability of the resins from olefin mixtures is also remarkably better. Whereas the molded propylene resin, for example, is very brittle and cannot be machined smoothly in a lathe, or drilled or tapped without chipping, the molded resins made from mixtures of propylene and butenes and pentenes can be machined, drilled, and tapped satisfactorily, as well, in fact, as most commercial resins.

To summarize, we have found that resins made by reacting sulfur dioxide with mixtures of olefins in various proportions have much higher mechanical strength and are tougher and more easily machined than resins made from pure single olefins. While the above illustrations show mixtures of only two olefins, we have found that similar results are obtainable with mixtures of three or more olefins. The present invention can be applied to any mixture of olefins which will react with sulfur dioxide. One or more diolefins may also be present in limited quantities. The reaction may be carried out in the presence of diluents such as paraffins.

Inasmuch as moldings of corresponding mixtures of resins made by reacting sulfur dioxide with the pure single olefins and then mixing the resinous products are very much inferior to those of resins made according to the present invention by reacting sulfur dioxide directly with the mixture of olefins, it is very probable that the improvement is the result of the co-polymerization or co-reaction of the different olefin molecules into the same high molecular weight, heteropolymeric resin molecules. However, we do not limit ourselves to such a theory.

The reaction may be carried out photochemically or by means of catalysts as described in copending application, Serial No. 599,350.

In practicing our invention it is frequently desirable to add one or more of the olefins continuously or stepwise during the course of the reaction. For example, propylene which reacts more rapidly than most other olefins, may be added during the course of the reaction of butenes with sulfur dioxide. The advantage of this procedure is that the more reactive olefins can be more homogeneously incorporated into the polymeric molecules.

Examples

The following examples will illustrate some methods of practicing the present invention:

1. To ten pounds of liquid sulfur dioxide contained in a pressure vessel, preferably constructed of stainless steel or lined with glass or porcelain, 50 cc. of a 5 per cent solution of silver nitrate in ethyl alcohol (preferably absolute) is added as a catalyst. After thoroughly mixing the catalyst with the sulfur dioxide, 744 grams of butene-2, 336 grams of butene-1 and 833 grams of propylene are added, and the mixture again stirred until uniform. The reaction is usually complete in 24–48 hours. Thereafter, most of the excess sulfur dioxide and any unreacted hydrocarbons may be bled off, the reactor opened, and the resin removed as a porous solid or semi-plastic mass; or, if the reaction vessel is fitted with a fairly large valve and outlet pipe near the bottom, the viscous gel of resin and sulfur dioxide may be allowed to flow out of the reactor and expand liberating the sulfur dioxide in another chamber from which the gases may be recovered and the porous solid resin removed later. The resin in this porous form is fairly easily ground in a ball mill or other suitable grinder. It is desirable to eliminate the remaining traces of sulfur dioxide and other gases as well as possible before molding. This is conveniently done by exposing the ground resin in a thin layer (in dryer trays, on belts, or by any of the other known methods) to a slow current of gas at 40–60° C. The molded resin is strong, tough and machinable.

While the sulfur dioxide and olefins react in equimolecular proportions, the resinous reaction product tends to remove extra sulfur dioxide in an adsorbed or dissolved condition from the reaction phase. For this reason it is advantageous, though not imperative, to use a moderate excess of sulfur dioxide.

The reaction may be carried out in the presence of diluent paraffins, cycloparaffins, etc., but is slower in such cases.

2. Twelve pounds of liquid sulfur dioxide, 50 cc. of a saturated solution of silver nitrate in alcohol, and 2.5 pounds of pentene-1 are mixed in a suitable pressure reaction vessel. Two pounds of propylene is added to the mixture continuously, or stepwise in two or more portions, over a period of 48 hours. After the reaction is complete, the viscous solution of resin in excess sulfur dioxide is treated as in Example 1.

The above examples are given merely for purposes of illustration and are not intended to limit the scope of the invention in any way.

Having described our invention so that it can be practiced by one skilled in the art, we claim:

1. A process for the production of high molecular weight heteropolymeric products of sulfur dioxide and olefins of improved physical properties, which consists in reacting sulfur dioxide with a mixture consisting of propylene and butene-1, the content of butene-1 being within the range of 8 to 50 mol. per cent of the mixture.

2. A process for the production of high molecular weight heteropolymeric products of sulfur dioxide and olefins of improved physical properties, which consists in reacting sulfur dioxide with a mixture consisting of propylene and butene-2, the content of butene-2 being within the range of 12.5 to 50 mol. per cent of the mixture.

3. A process for the production of high molecular weight heteropolymeric products of sulfur dioxide and olefins of improved physical properties, which consists in reacting sulfur dioxide with a mixture consisting of propylene and pentene-1, the content of pentene-1 being within the range of 25 to 50 mol. per cent of the mixture.

4. The process of producing a high molecular weight, heteropolymeric compound of improved physical characteristics and of the sulfur dioxide olefin type, which consists in reacting sulfur dioxide with a mixture of propylene and a sufficient quantity of an aliphatic olefin of from four to six carbon atoms per olefin molecule to modify the physical properties of the compound produced as compared to a compound containing only one of the reacted olefins.

5. The process of producing high molecular weight heteropolymeric reaction products of sulfur dioxide and two or more aliphatic olefins of improved physical characteristics, which consists in reacting sulfur dioxide with a mixture of aliphatic olefins, the said mixture containing sufficient proportions of at least two aliphatic olefins containing from three to six carbon atoms per molecule which differ from each other in molecular weight and number of carbon atoms in the olefin molecule to modify the physical properties of the compound produced as compared to a compound containing only one of the reacted olefins.

6. The process of producing high molecular weight heteropolymeric compounds of sulfur dioxide and two or more aliphatic olefins which consists in reacting sulfur dioxide with an aliphatic olefine of from three to six carbon atoms per molecule, and adding to the mixture a sufficient quantity of another and different aliphatic olefin of from three to six carbon atoms per molecule during the course of reaction to modify the physical properties of the resultant product as compared to the compound containing only a single olefin.

7. As a new composition of matter of desirable physical properties, a high molecular weight heteropolymeric compound consisting of sulfur dioxide, propylene and an aliphatic olefin of from four to six carbon atoms per olefin molecule in a mutually chemically combined state.

8. As a new composition of matter of desirable physical properties, a high molecular weight heteropolymeric compound consisting of sulfur dioxide, propylene and butene-1, the content of butene-1 being within the range of 8 to 50 mol. per cent of the olefin content of the composition.

9. As a new composition of matter of desirable physical properties, a high molecular weight heteropolymeric compound consisting of sulfur dioxide, propylene and butene-2, the content of butene-2 being within the range of 12.5 to 50 mol. per cent of the olefin content of the compound.

10. As a new composition of matter of desirable physical properties, a high molecular weight heteropolymeric compound consisting of propylene and pentene-1, the content of pentene-1 being within the range of 25 to 50 mol. per cent of the olefin content of the compound.

11. As a new composition of matter, a high molecular weight heteropolymeric compound consisting of sulfur dioxide, propylene and sufficient quantity of an aliphatic olefin of from four to six carbon atoms per olefin molecule to modify the physical properties of the compound as compared to a compound containing only one of the olefins.

12. As a new composition of matter, a high molecular weight heteropolymeric compound consisting of sulfur dioxide and two or more aliphatic olefins having a carbon content of from three to six carbon atoms per molecule and differing from each other in molecular weight and number of carbon atoms per molecule, the relative proportions of said olefins in said mixture being sufficient to materially improve and modify the physical properties of the compound as compared to a compound of sulfur dioxide and only one olefin.

FREDERICK E. FREY.
ROBERT D. SNOW.